Oct. 23, 1962
C. H. PHELPS
3,059,479
DYNAMIC DEFLECTION INDICATING APPARATUS
Filed Sept. 24, 1959
3 Sheets-Sheet 1
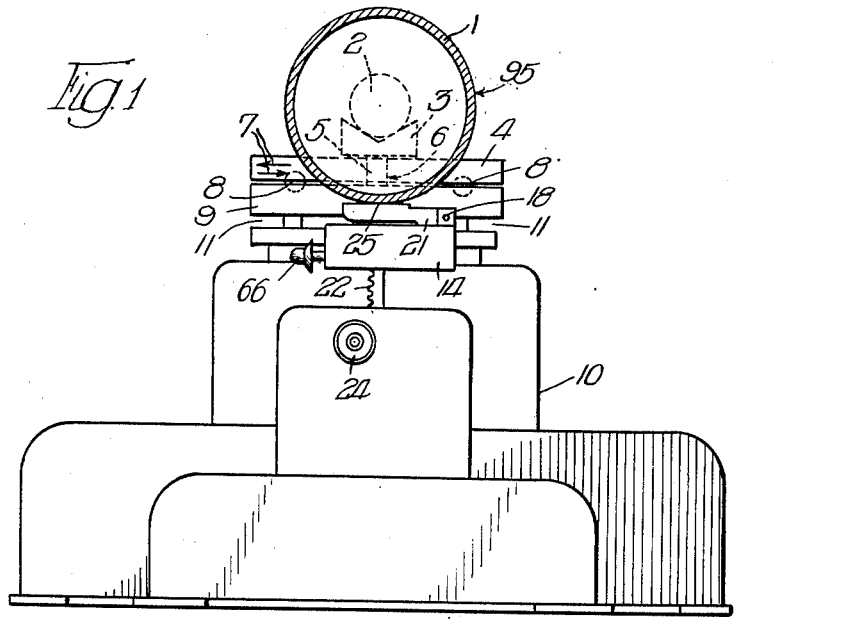
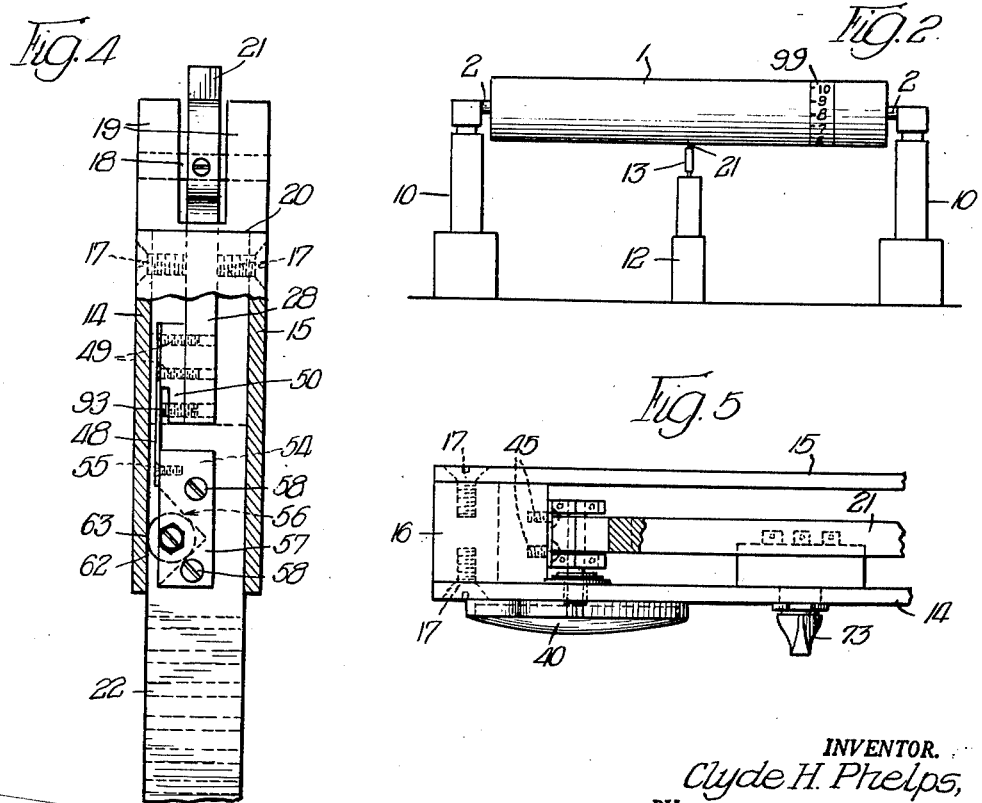
INVENTOR.
Clyde H. Phelps,
BY

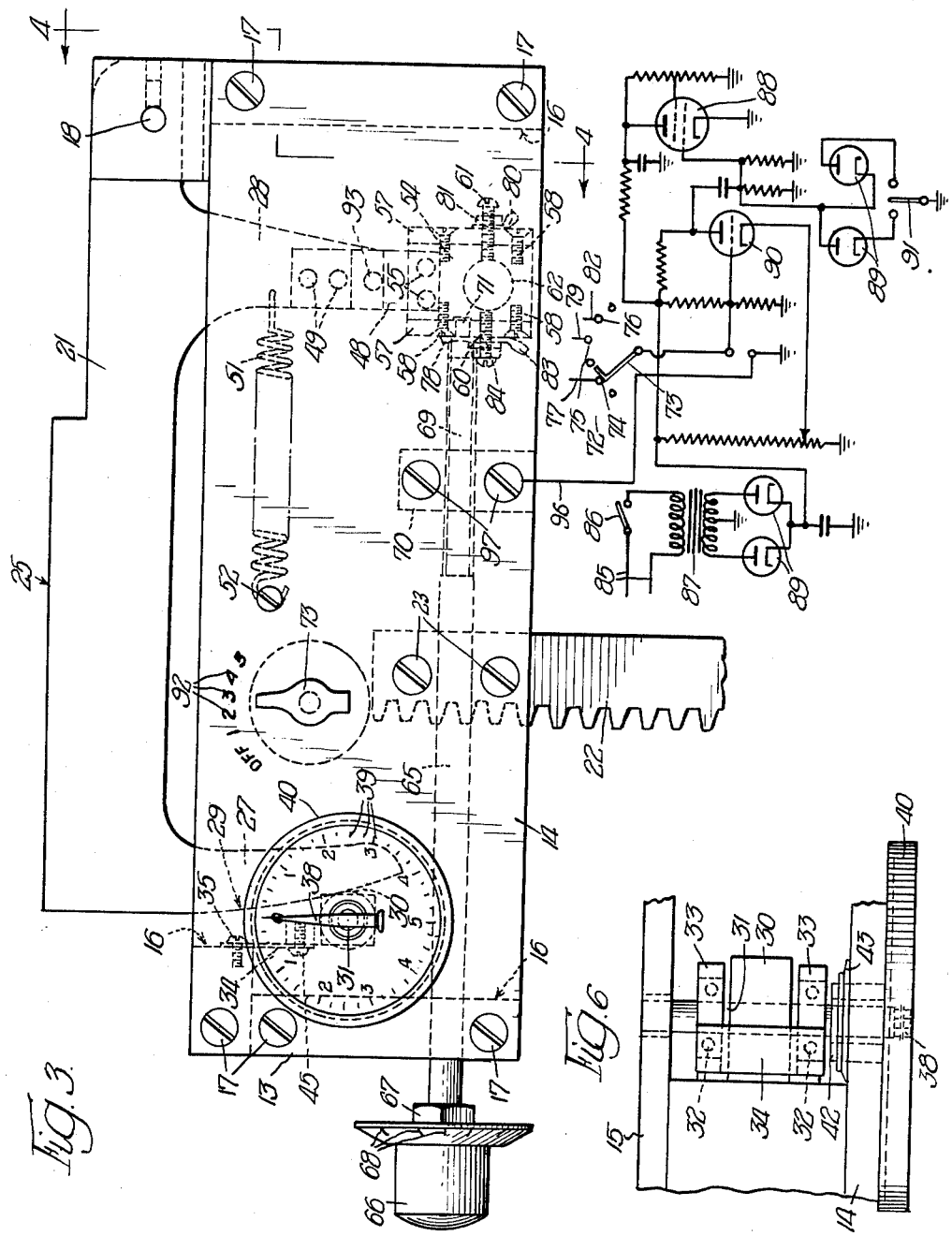

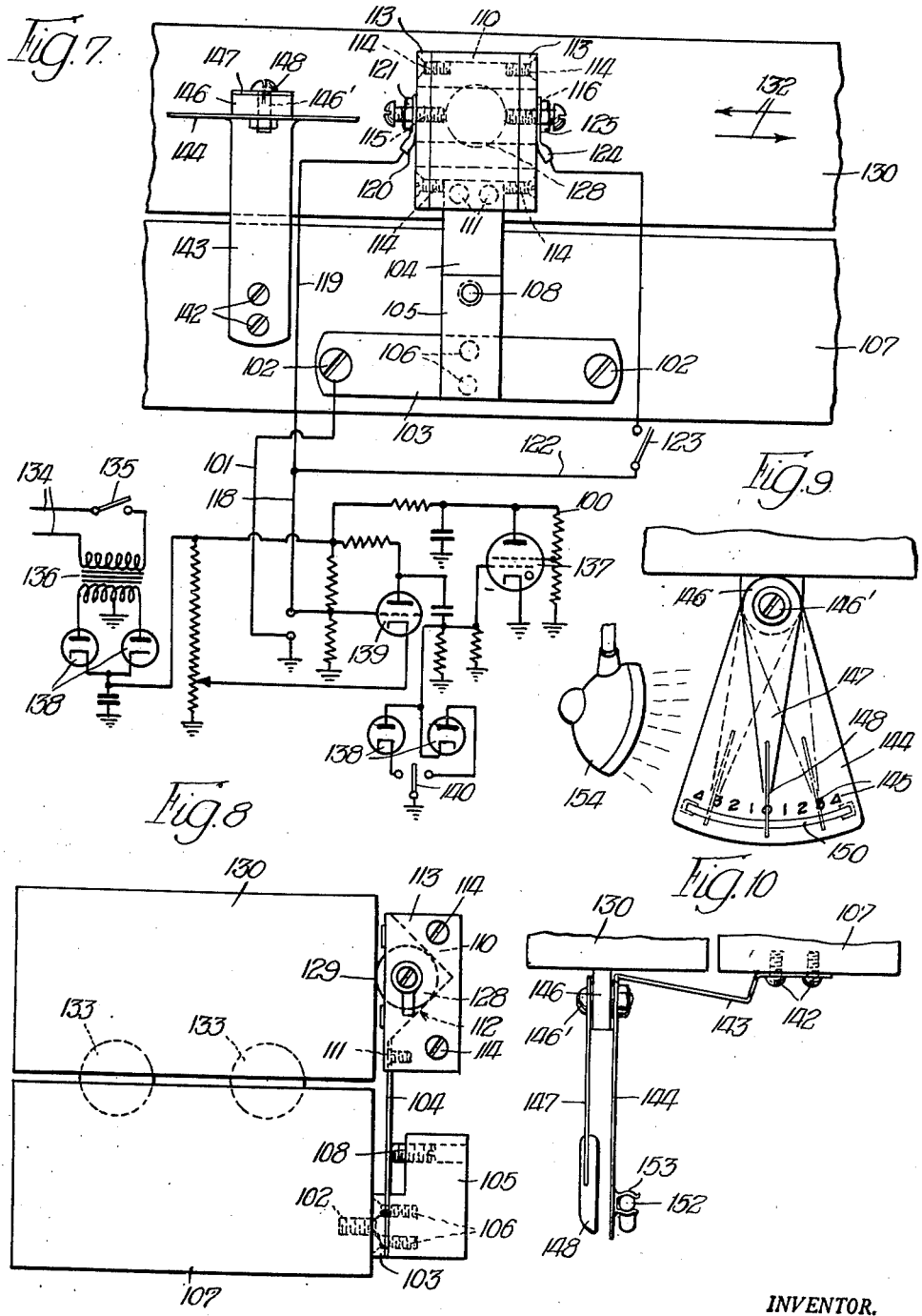

United States Patent Office
3,059,479
Patented Oct. 23, 1962

3,059,479
DYNAMIC DEFLECTION INDICATING APPARATUS
Clyde H. Phelps, Springfield, Ill., assignor to Raydyne Corporation, Springfield, Ill., a corporation of Illinois
Filed Sept. 24, 1959, Ser. No. 842,144
2 Claims. (Cl. 73—466)

This invention relates to deflection indicating apparatus, and more particularly to dynamic deflection indicating apparatus for indicating bending, whipping, or deflections in flexible tube rolls used in the manufacture of paper, printing press rolls, and other rotary members.

The deflection indicating apparatus of the present invention also includes mechanism which is adapted for application to a balance testing machine as a balance testing unit for both value and position of unbalance.

Rotors, such, for example, as the long, flexible tube rolls used in the manufacture of paper, printing press rolls and other elongated rolls that are subject to excessive bending, whipping, or deflections while rotating, cause excessive destructive vibration to the rotor and its associated machine.

Such rotors, in particular the hollow or tube type roll, may be in perfect running balance at a given speed, but when operated at increased speeds will whip violently. The higher speeds are now the requirement in most cases.

It is often the case that this whip condition is the limiting factor of operating speed of a machine, the unit operating smoothly until a speed is reached where whip starts and becomes increasingly greater with further increase in speed, thus limiting the output of the complete machine.

Many paper mills, for example, are forced to operate at reduced speed because the very great number of elongated rolls used in each mill are subject to this whip condition. This seriously limits the feet of paper produced per unit of time.

If just one roll in a mill containing several hundred rolls starts whipping to the extent that the running sheet is broken, the entire mill must be shut down and the roll corrected or replaced. This is a very costly procedure.

These tube rolls are made from pipes or tubes and such material has a non-uniform wall thickness which creates an unbalanced condition which can be corrected in two end planes for low speed operation. However, as the speed is increased, the thicker wall section soon develops sufficient centrifugal force to deflect or bend it outward. The roll then runs in a whirl with violent vibration and further increase in speed is impossible.

Conventional balancing, both in theory and practice, is concerned with rigid rotors that do not deflect, whereas the apparatus of the present invention, both in theory and practice, is concerned with "non-rigid" rotors that are subject to the "whip"' conditions herein set forth and which may be in perfect dynamic balance at one speed, but violently whip at some higher speed.

The apparatus of the present invention is adapted for use with a conventional balance testing machine, wherein the rotor may be corrected to a state of good dynamic balance at some low speed.

The broad concept of the present invention resides in the provision of dynamic deflection indicating apparatus having a movable member, and more particularly a member pivoted for rocking movement, for positioning in close proximity to the surface of a rotary member; also means operating by actuation of this movable or pivoted member by whip in the rotary member for indicating the point or place of whip in the rotary member, and indicator means operated by actuation of the movable or pivoted member for indicating the amount of whip in the rotary member.

Another broad concept of the invention resides in the provision of deflection indicating apparatus which includes mechanism adapted for application to a balance testing machine as a balance testing unit for both value and position of unbalance.

The deflection indicating apparatus, according to the present invention, includes a work head on which the gauge bar or pivoted member is pivoted, a rack and a hand wheel functioning with the rack to position the gauge bar in close proximity to the surface of the rotary member, so that the gauge bar will be rocked about its pivot by whip in the rotary member.

Another feature resides in the provision of apparatus in which the pivoted lever arm or gauge bar has a portion provided with a curved surface engaging a spring loaded roller for actuating a pointer which cooperates with graduated scale to indicate the amount of whip in the rotary member.

Another feature resides in the provision of apparatus in which the pivoted lever arm or gauge bar carries contact means operating in conjunction with a stroboscopic light to indicate the point or place of whip in the rotary member.

Another feature resides in the provision of apparatus in which the contact means comprises electrically isolated contacts, a V-block and a ball coacting with the V in the block and with the contacts.

Another feature resides in the provision of apparatus in which there is adjustment and calibration means for adjustment and calibration of the contact means.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a view showing deflection indicating apparatus according to the present invention in relation to its supporting pedestal and the rotary member;

FIGURE 2 is a more or less diagrammatic view showing the position of the deflection indicating apparatus between the ends of the roll or other rotary members.

FIGURE 3 is a view showing the work head and the gauge bar or pivoted member of the deflection indicating apparatus; also the means including the stroboscopic light circuit for indicating the point of whip in the rotary member, and the indicator means for indicating the amount of whip in the rotary member;

FIGURE 4 is a sectional view taken along the line 4—4 of FIGURE 3;

FIGURE 5 is a fragmentary top plan view of one end of the deflection indicating apparatus;

FIGURE 6 is a fragmentary top plan view showing the roller, the adjustable dial and related parts;

FIGURE 7 is a fragmentary view showing mechanism of FIGURES 1 through 6 applied to a balance testing machine as a balance testing unit for both value and position of unbalance;

FIGURE 8 is an end view of the mechanism shown in FIGURE 7;

FIGURE 9 is a top plan view of the portion of the mechanism of FIGURE 7 which indicates the amount of unbalance in rotary members; and FIGURE 10 is an end view of the mechanism shown in FIGURE 9.

Referring first to the embodiment of the invention illustrated in FIGURES 1 through 6 of the drawings, the ends of the rotary member 1, which is shown in FIGURE 1 in the form of a hollow or tube roll, or its journals 2 (FIGURES 1 and 2) are supported for rotation in bearing supports 3, illustrated as of V-block form. The bearing supports 3 are mounted upon the upper movable heads 4 of a balance testing machine to turn about the axes of pivot pins 5 which turn in openings 6 in the movable heads 4.

The movable heads 4 have movement or oscillation, in the directions of the arrows 7 (FIGURE 1) on balls 8 supported by the lower static heads 9 of the balance testing machine. One movable head 4 and one static head 9 are shown in FIGURE 1. The lower static heads 9 at opposite ends of the roll 1 are supported by end pedestals 10. Leveling devices 11 are shown between the lower static heads 9 and the pedestals 10 for leveling the heads 9, as well understood in the art.

In FIGURE 2, the deflection indicating apparatus of the present invention is shown positioned beneath and substantially centrally between the ends of the roll 1 and has a supporting pedestal 12 and a work head 13, as shown in FIGURE 1 and FIGURES 3–6.

The work head 13 has a pair of side plates 14 and 15 spaced by spacers 16 (FIGURES 3 and 5) to which the side plates 14 and 15 are secured by screws 17. Pivoted by a pivot pin 18 between the arms 19 of a pivot bar 20 on the work head 13 is a gauge bar or pivoted lever arm 21. A rack 22 is attached to the work head 13 by screws 23, and a hand wheel 24 functions with this rack 22 to adjust the upper surface or edge 25 of the gauge bar 21 into close proximity to the surface of the rotary member 1. In actual practice the work head is adjusted vertically until the lever arm 21 just clears the surface of the rotary member 1 by a few thousandths of an inch.

The lever arm 21 has a pair of depending arms 27 and 28 positioned for rocking movement between the side plates 14 and 15. Th arm 27 has a curved surface 29 which frictionally coacts with or engages the surface of a roller 30 to turn the roller 30 and a pin 31 carrying the roller by pivotal movement of the lever 21. The pin 31 turns in ball bearings 32 carried by pivot frames 33, which are carried by a spring 34 attached by screws 35 to the upper spacer 16 at the lefthand end of the work head, as the same is illustrated in FIGURE 3. The spring 34 presses the roller 30 against the curved surface 29.

One end of the pin 31 projects through the side plate 14 and carries an elongated pointer 38, which coacts with a graduated scale 39 on an adjustable dial 40 to indicate the amount of whip in the rotary member 1, as will presently appear. The adjustable dial 40 is disposed outwardly of the side plate 14 and a retaining ring is shown at 42 and a spring washer is shown at 43. The frames 33 are attached to the spring 34 by screws 45.

Attached to arm 28 for rocking movement therewith between the side plates 14 and 15 is a spring 48. This attachment is accomplished, for example, by screws 49 with a spring block 50 interposed between the spring 48 and the adjacent portion of the arm 28. A tension screw 93 screwed in block 50 and arm 28, adjustably coacts with the spring 48 endwise at the adjacent end of the screw 93, by screwing the screw 93 into and out of the arm 28, for example, by engaging a screwdriver in the kerfed opposite end of the screw 93, to adjust the tension in the spring 48. A coiled spring 51 connected between the arm 28 and a screw 52 screwed, for example, through the side plate 14 biases the lever arm 21 to the position shown in FIGURE 3.

A conducting V-block 54 is attached to the lower end of the spring 48 by screws 55. This block 54 has a V groove or V 56 therein. Insulating end members 57 are fastened to the opposite ends of the V-block 54 by screws 58. A pair of axially aligned contact screws 60 and 61 are screwed or threaded one through each of the end members 57 and are thus electrically isolated.

A conducting ball 62 constitutes the third contact. This ball 62 coacts or seats in the V 56 in the block 54 and the contact screw 60 is shifted by counter-clockwise rocking movement of lever arm 21 into contact with the ball 62, whereas the contact 61 is shifted by clockwise rocking movement of lever arm 21 into contact with the ball 62. As screw 60 moves to contact with the ball 62, screw 61 moves out of contact with the ball and vice versa. Rolling coaction of the ball 62 with the side plate 14 at 63 (FIGURE 4) permits pivotal movement of the lever arm 21 in amount equal to the amplitude of the whip in the rotary member 1 and allows the movement of the contact screws 60 and 61 into and out of contact with the ball 62 to be only a relatively small part of the rocking movement of the arm 21.

The indicator screw 65 provides for fine adjustment and calibration of the contact means. This screw 65 extends at its outer end through the spacer 16 at the lefthand end of the work head 13, as the apparatus is shown in FIGURE 3, and carries an indicator dial 66. A nut is provided at 67. The dial 66 bears an appropriately graduated scale 68. The threaded portion 69 of the screw 65 is screwed or threaded through a conducting nut block 70, fixed in place between the side plates 14 and 15. The inner end of the screw 65 has a portion 71 extending, for example, through the adjacent insulating end member 57 and contacting the V-block 54.

A conventional stroboscopic circuit has a switch 72 provided, for example, with a switch arm 73 pivoted to be turned into contact with terminals 74, 75 and 76. Terminal 74 is connected by a conductor 77 to a terminal 78 at the screw 65. Terminal 75 is connected by a conductor 79 to a terminal 80 locked in place on the contact screw 61 by a lock nut 81. Terminal 76 is connected by a conductor 82 to a terminal 83 locked in place on the contact screw 60 by a lock nut 84. The other side of the stroboscopic circuit is connected by a conductor 96 to the nut block 70, for example, through one of the screws 97.

The stroboscopic flashing circuit selected for illustration has an alternating current line 85, switch 86, constant voltage transformer 87, stroboscopic light 88, tube or tubes having two sets of elements 89, a three element tube 90, and a switch 91 adapted to be set to flash on make, or on break, or to eliminate the flash on both. In the stroboscope flashing circuit, initially disregarding any potential applied over the conductor 85 to the grid of triode 90, the voltages applied to the cathode and control grid of tube 90 cause this tube to conduct. If the tube is then cut off, the rapid positive-going transition of its anode potential is differentiated across the RC circuit shown and utilized to provide a trigger pulse to flash stroboscope tube 88. When the tube is subsequently rendered conductive and its anode potential rapidly goes negative, this voltage change is also differentiated, and similarly utilized to provide a firing pulse for the stroboscope. However, if it is desired to provide such pulses responsive only to tube cut-off, or to tube conduction, the proper connection of switch 91 is utilized to shunt one or another of flashing pulses to ground over diodes 89. Tube 90 is cut off as conducting ball 62 is moved into engagement with one of the contacts as previously described, applying ground potential to the grid of tube 90 as a positive voltage applied to cathode and cutting the tube off. When conducting ball 62 is later displaced from engagement with the contact, the ground connection is removed and the potential applied to the grid of triode 90 goes positive relative to the cathode potential and causes the tube again to conduct to provide the requisite firing pulse at the control grid of stroboscope tube 88.

The switch arm 73 may be mounted to turn on the side plate 14, as shown in FIGURE 3 and "Off" position, and five other positions of the switch arm may be marked "1" through "5" on the side plate 14, as indicated at 92.

In use of the apparatus, the roll or rotary member 1 is placed in the bearings 3 and the deflection indicating apparatus is placed, for example, as indicated in FIGURE 2, with the pivoted arm 21 beneath the surface of the rotary member 1. The work head is then adjusted vertically by the hand wheel 24 and rack 22 until the surface or edge 25 of the lever arm 21 just clears the surface of the rotary member 1, for example, by a few thousandths of an inch.

The roller 1 may now be placed in rotation, for example, by a driving belt (not shown) passing about the same at the speed at which it was dynamically balanced and accordingly does not have any motion in the horizontal plane. Then, because the balancing machine is rigid through the vertical plane, there is no vertical or horizontal displacement between the roll surface 95 and the pivoted lever arm 21. The speed of the roll 1 may now be increased to test for whip.

As the speed is increased and whip develops, the roll 1 will deflect up and down against the rigid vertical support of the balance testing machine, and will actuate or rock the spring loaded pivoted lever arm 21 about its pivot 18.

The contact means carried by the arm 28 of the pivoted lever 21 makes and breaks contact with the ball 62 by the rocking movement imparted to the lever 21 by the whip in the rotary member 1. And the stroboscopic light indicates on index means 99 around the roll 1 (FIGURE 2) the position of the throw-out of the roll or rotary member 1.

At the same time the coaction of the curved surface 29 of the arm 27 of lever 21, with the roller 30, turns the pointer 38 with respect to the scale 39 to indicate the amount of throw-out or whip in the rotary member 1. The elongated form of the pointer 38 provides amplified indication on the scale 39 of the amount of whip condition of the rotary member 1.

In the embodiment of the invention illustrated in FIGURES 7 through 10, one side of the stroboscopic light circuit 100 is connected by a conductor 101 and, for example, one of the screws 102 to a terminal or conducting strip 103 and through the strip 103 to a tension spring 104. A block 105 is secured to the strip 103 by screws 106, and the strip 103 is secured to the lower static head 107 of a balance testing machine by the screws 102. A tension screw 108 screwed in the block 105 and coacting with the tension spring 104 is adjustable to adjust the tension in the spring 104.

The V-block 110 which corresponds with the V-block of the embodiment of the invention illustrated in FIGURES 1 through 6 is attached to the upper end of the spring 104 by screws 111. The V-block 110 has a V-groove or V therein at 112.

The insulating end members 113 are fastened to the ends of the V-block 110 by screws 114. The axially aligned contact screws 115 and 116 are screwed or threaded one through each of the end members 113 and, as before, are electrically isolated.

The other side of the stroboscopic circuit 100 is connected by conductors 118 and 119 to a terminal 120 locked in place on the contact screw 115 by a lock nut 121. This other side of the stroboscopic circuit is also shown connected by a conductor 122 in which there is a switch 123 to a terminal 124 locked in place on the contact screw 116 by a lock nut 125.

The ball 128 which seats in the V in the block 110 is similar to the ball 62 of the previous embodiment of the invention, and operates similarly, except that it has rolling coaction at 129 with the upper movable head 130 of the balance testing machine. The head 130 is moved or oscillated endwise, as indicated by the arrows 132 in FIGURE 7 by unbalance in a rotary member supported, for example, in a suitable bearing support (not shown) on the head 130. The head 130 moves on balls 133 supported by the lower static head 107 of the balance testing machine.

The stroboscopic circuit, as shown in FIG. 7, has an alternating current line 134, switch 135, constant voltage transformer 136, stroboscopic light 137, tube or tubes having two sets of elements 138, a three-element tube 139, and a switch 140 adapted to be set to flash on make or on break, or to eliminate the flash on both. The stroboscopic light 137 indicates, for example, on index means around the rotary member, as shown at 99 in FIGURE 2, the position or point of unbalance in the rotary member.

For the purpose of indicating the amount or value of unbalance in the rotary member, there is attached by screws 142 to the lower static head 107 an angular bracket 143 having an outstanding horizontal scale bearing portion 144. The scale bearing portion bears on its upper surface a scale 145 graduated and marked to indicate the amount or value of unbalance. Rotatable about the axis of a pin 146' mounted on the outstanding portion 144 of the bracket 143 is a roller 146. An indicating arm 147 is mounted to turn with the turning movement of the roller 146, and has at its outer end a pointer strip 148 which coacts with the scale 145.

The roller 146 frictionally engages the adjacent surface of the movable top head 130 of the balance testing machine. The roller 146 is thus turned about its axis by movement of the movable head 130 and in amount in proportion to the movement imparted to the head 130 by unbalance in the rotary member. The indicating arm or the pointer 148 is thus swung about the scale 145 to indicate the amount or value of unbalance in the rotary member.

The scale bearing portion of the bracket 143 has an arcuate opening 150 therethrough adjacent to the scale 145. An illuminating light, such as a neon light 152, is mounted by clips 153 on the scale bearing portion of the bracket 143 beneath the opening 150 to provide illumination adjacent to the scale and indicator, or pointer. A light is also shown at 154.

The embodiments of the invention disclosed in the drawings and the specification are for illustrative purposes only, and it is to be especially understood that said drawings and the specification are not to be construed as a definition of the limits or scope of the invention, reference being had to the appended claims for that purpose.

I claim:

1. Dynamic deflection indicating apparatus comprising, in combination, a work head having a pair of side plates, a pivoted gauge bar having arms positioned for rocking movement between said side plates, an adjustable dial disposed outwardly of one of said side plates and having a scale thereon, a pin carrying a roller, one of said arms having a curved surface coacting with said roller to turn said pin by pivotal movement of said gauge bar, a pointer on said pin and coacting with said scale for indicating the amount of pivotal movement of said gauge bar, and contact means operated by rocking the other arm of the gauge bar for operating in conjunction with a stroboscopic light to indicate the point where pivotal movement is imparted to said gauge bar.

2. Dynamic deflection indicating apparatus according to claim 1 wherein there is a pedestal for supporting said gauge bar beneath a rotary member, a rack attached to said work head, and a hand wheel functioning with said rack to position said gauge bar in close priximity to the surface of the rotary member so that said gauge bar will be rocked about its pivot by whip in said rotary member.

(References on following page)

References Cited in the file of this patent

UNITED STATES PATENTS

| | | |
|---|---|---|
| 2,001,826 | Russell et al. | May 21, 1935 |
| 2,130,122 | Dybvig | Sept. 13, 1938 |
| 2,180,607 | Parsons | Nov. 21, 1939 |
| 2,363,303 | Ehrgott et al. | Nov. 21, 1944 |
| 2,486,896 | Weaver et al. | Nov. 1, 1949 |
| 2,561,204 | Johnson | July 17, 1951 |
| 2,616,288 | Mesa | Nov. 4, 1952 |
| 2,722,828 | Holaday et al. | Nov. 8, 1955 |
| 2,754,686 | Phelps | July 17, 1956 |
| 2,773,389 | King | Dec. 11, 1956 |
| 2,786,654 | Greer | Mar. 26, 1957 |
| 2,921,999 | Ziegler | Jan. 19, 1960 |
| 2,938,389 | Mailhot | May 31, 1960 |
| 2,953,923 | Moore | Sept. 27, 1960 |